United States Patent
Oko

(10) Patent No.: US 11,830,206 B2
(45) Date of Patent: Nov. 28, 2023

(54) STEREO CAMERA APPARATUS AND CONTROL DEVICE

(71) Applicant: SUBARU CORPORATION, Tokyo (JP)

(72) Inventor: Akitaka Oko, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/850,246

(22) Filed: Jun. 27, 2022

(65) Prior Publication Data
US 2023/0011802 A1    Jan. 12, 2023

(30) Foreign Application Priority Data
Jul. 9, 2021    (JP) ................. 2021-114049

(51) Int. Cl.
| | |
|---|---|
| *G06T 7/285* | (2017.01) |
| *H04N 13/128* | (2018.01) |
| *H04N 13/239* | (2018.01) |
| *G06T 7/215* | (2017.01) |
| *H04N 13/00* | (2018.01) |

(52) U.S. Cl.
CPC .............. *G06T 7/285* (2017.01); *G06T 7/215* (2017.01); *H04N 13/128* (2018.05); *H04N 13/239* (2018.05); *G06T 2207/10012* (2013.01); *H04N 2013/0081* (2013.01)

(58) Field of Classification Search
CPC .............. G06T 7/285; G06T 7/215; G06T 2207/10012; H04N 13/128; H04N 13/239; H04N 2013/0081

USPC .......................................... 348/47
See application file for complete search history.

(56) References Cited

U.S. PATENT DOCUMENTS

| | | | |
|---|---|---|---|
| 2014/0307925 A1* | 10/2014 | Uemori | G01B 11/14 382/106 |
| 2015/0288953 A1 | 10/2015 | Kakegawa | |
| 2019/0026544 A1* | 1/2019 | Hua | A61B 5/1128 |
| 2020/0074848 A1* | 3/2020 | Namba | G06V 20/56 |

FOREIGN PATENT DOCUMENTS

| | | |
|---|---|---|
| JP | 2014-85120 A | 5/2014 |
| JP | 2017-44573 A | 3/2017 |

* cited by examiner

*Primary Examiner* — Allen C Wong
(74) *Attorney, Agent, or Firm* — TROUTMAN PEPPER HAMILTON SANDERS LLP

(57) ABSTRACT

A stereo camera apparatus includes a stereo camera, a speed sensor, and a control device. The control device includes one or more processors and one or more storage media. The one or more processors are configured to: detect corresponding points from a first image pair and a second image pair to be captured at different times by the stereo camera; divide each of images of the first image pair and the second image pair into regions; calculate, for each of the regions, a movement speed based on an external parameter by using one or more of the corresponding points included in the each of the regions; and calculate, for the each of the regions, a parallax correction value to cause a difference between the movement speed based on the external parameter and a movement speed detectable by the speed sensor to fall below a predetermined threshold.

4 Claims, 5 Drawing Sheets

STEREO CAMERA APPARATUS AND CONTROL DEVICE

CROSS-REFERENCE TO RELATED APPLICATION

The present application claims priority from Japanese Patent Application No. 2021-114049 filed on Jul. 9, 2021, the entire contents of which are hereby incorporated by reference.

BACKGROUND

The technology relates to a stereo camera apparatus and a control device.

A stereo camera apparatus is able to measure a distance to an object on the basis of images obtainable by paired cameras. To calculate the distance to the object, the stereo camera apparatus uses a parallax between the paired cameras. An error in the parallax can lead to degradation of the accuracy of measurement. Various techniques have thus been proposed to achieve improved parallax accuracy. For example, reference is made to Japanese Unexamined Patent Application Publication No. 2014-085120.

SUMMARY

An aspect of the technology provides a stereo camera apparatus including a stereo camera, a speed sensor, and a control device. The control device includes one or more processors, and one or more storage media that hold a command to be executed by the one or more processors. The one or more processors are configured to, in accordance with the command: detect corresponding points from a first image pair and a second image pair to be captured at different times by the stereo camera; divide each of images of the first image pair and the second image pair into regions; calculate, for each of the regions, a movement speed based on an external parameter by using one or more of the corresponding points included in the each of the regions; and calculate, for the each of the regions, a parallax correction value to cause a difference between the movement speed based on the external parameter and a movement speed detectable by the speed sensor to fall below a predetermined threshold.

An aspect of the technology provides a stereo camera apparatus including a stereo camera and a control device. The control device includes one or more processors, and one or more storage media that hold a command to be executed by the one or more processors. The one or more processors are configured to, in accordance with the command: detect corresponding points from a first image pair and a second image pair to be captured at different times by the stereo camera; divide each of images of the first image pair and the second image pair into regions; select a reference region from among the regions; calculate, for each of the regions, a movement speed based on an external parameter by using one or more of the corresponding points included in the each of the regions; and calculate an individual parallax correction value for the each of the regions other than the reference region to cause a difference between the movement speed in the reference region and the movement speed in the each of the regions other than the reference region to fall below a predetermined threshold.

An aspect of the technology provides a control device communicable with a stereo camera and a speed sensor to be provided in a mobile body. The control device includes one or more processors, and one or more storage media that hold a command to be executed by the one or more processors. The one or more processors are configured to, in accordance with the command: detect corresponding points from a first image pair and a second image pair to be captured at different times by the stereo camera; divide each of images of the first image pair and the second image pair into regions; calculate, for each of the regions, a movement speed based on an external parameter by using one or more of the corresponding points included in the each of the regions; and calculate, for the each of the regions, a parallax correction value to cause a difference between the movement speed based on the external parameter and a movement speed detectable by the speed sensor to fall below a predetermined threshold.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
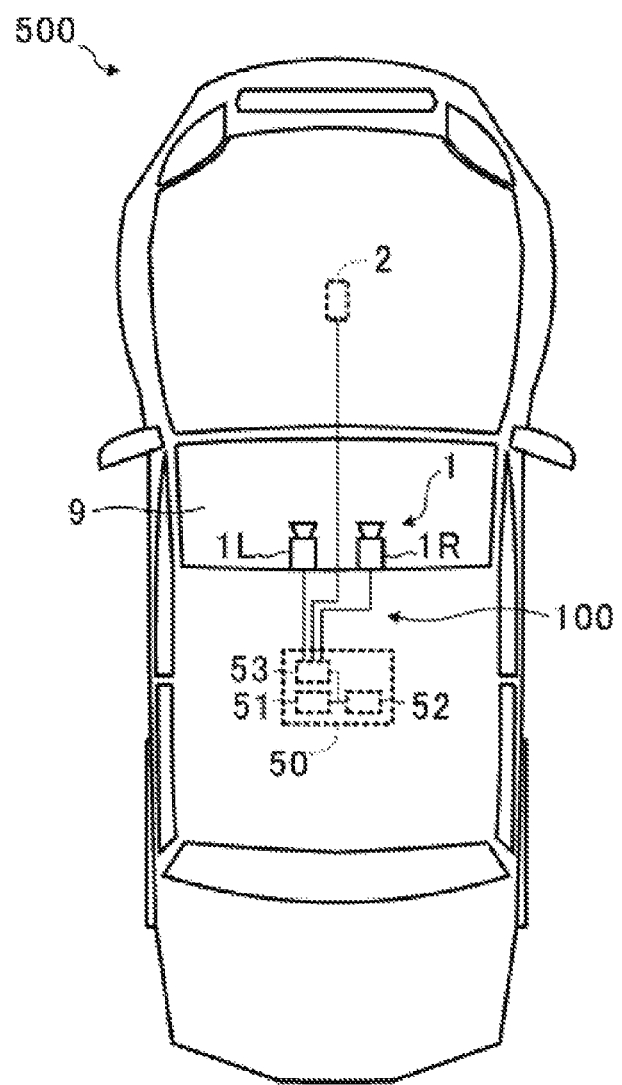
FIG. 1 is a schematic plan view of a vehicle including a stereo camera apparatus according to an example embodiment of the technology.

A parallax can include errors resulting from various factors. For example, in a case where stereo camera apparatuses are installed in vehicles, some of the errors can depend on respective environments in which the individual camera apparatuses are installed, such as distortion of the windshield. Such errors can be difficult to estimate in advance.

It is desirable to provide a stereo camera apparatus and a control device that each make it possible to eliminate parallax errors.

In the following, some example embodiments of the technology are described in detail with reference to the accompanying drawings. Note that the following description is directed to illustrative examples of the disclosure and not to be construed as limiting to the technology. Factors including, without limitation, specific dimensions, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

FIG. 1 is a schematic plan view of a vehicle 500 including a stereo camera apparatus 100 according to an example embodiment of the technology. In the present example embodiment, the stereo camera apparatus 100 may be applied to the vehicle 500. In another example embodiment, the stereo camera apparatus 100 may be applied to a mobile body other than the vehicle 500, e.g., an aircraft such as a helicopter. The stereo camera apparatus 100 may measure a distance to an object on the basis of images obtainable by a pair of cameras, i.e., a first camera 1L and a second camera 1R. The stereo camera apparatus 100 includes a stereo camera 1, a vehicle speed sensor 2, and an electronic control unit (ECU) 50. In one embodiment, the vehicle speed sensor 2 may serve as a "speed sensor", and the ECU 50 may serve as a "control device".

The stereo camera 1 may include the first camera 1L and the second camera 1R. For example, the first camera 1L and the second camera 1R may each be a charge-coupled device (CCD) camera or a complementary metal oxide semiconductor (CMOS) camera, and may each be a color camera or a monochrome camera. For example, the first camera 1L and the second camera 1R may each be provided in an interior of the vehicle 500 to capture images of the front view from the vehicle 500. For example, the first camera 1L and the second camera 1R may each be slightly spaced from a windshield 9 and attached to the bottom of the roof of the vehicle 500. The first camera 1L and the second camera 1R may be disposed with a predetermined spacing therebetween in a direction of the vehicle width.

The first camera 1L and the second camera 1R may each capture images at a predetermined frame rate, for example. The first camera 1L and the second camera 1R may each be wiredly or wirelessly communicably coupled to the ECU 50 and transmit the captured images to the ECU 50.

The vehicle speed sensor 2 may detect a speed (a movement speed) V0 of the vehicle 500. For example, the vehicle speed sensor 2 may detect the speed V0 on the basis of the number of revolutions of an output shaft of the vehicle 500. The vehicle speed sensor 2 may be wired or wirelessly communicably coupled to the ECU 50 and transmit the detected speed V0 to the ECU 50. In another example embodiment, the speed sensor may be a sensor that detects a flying speed of an aircraft serving as the moving body, for example.

The ECU 50 may include one or more processors 51, one or more storage media 52, and one or more connectors 53. Examples of the processor 51 include a central processing unit (CPU). Examples of the storage medium 52 include a read-only memory (ROM) and a random-access memory (RAM). The ECU 50 may further include other components. The components of the ECU 50 may be communicably coupled to each other by means of a bus. The storage medium 52 may hold one or more programs to be executed by the processor 51. The program may include a command to the processor 51. Operations of the ECU 50 described in the present disclosure are achieved by execution, by the processor 51, of the command held in the storage medium 52. In addition, the storage medium 52 may hold images received from the first camera 1L and the second camera 1R and the speed V0 received from the vehicle speed sensor 2. Further, the storage medium 52 may hold an external parameter E, a speed V1 based on the external parameter E, and parallax correction values θ, θ0, and θ1, which will be described later. The external parameter E, the speed V1, and the parallax correction values θ, θ0, and θ1 may be calculated by the processor 51. The ECU 50 may be communicably coupled to the first camera 1L, the second camera 1R, and the vehicle speed sensor 2 via the connector(s) 53.

Next, a description will be given of images to be captured by the stereo camera 1 and the operations of the ECU 50.

Figure 2:
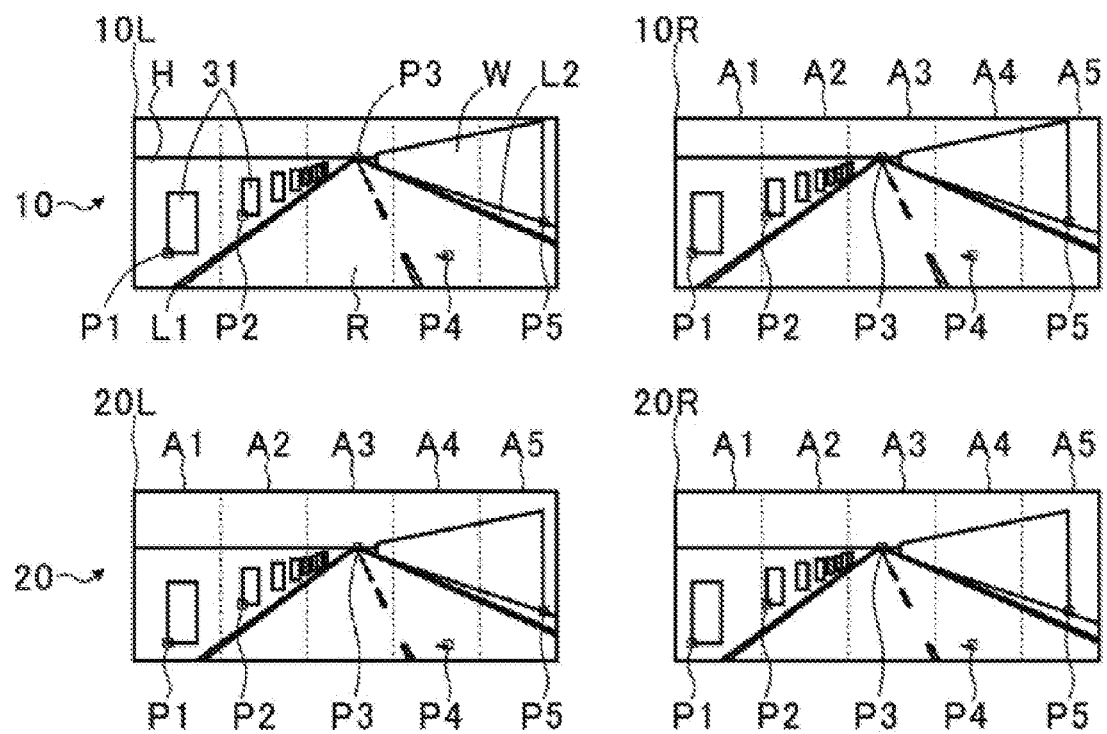
FIG. 2 illustrates an example of a first image pair and a second image pair.

FIG. 2 illustrates an example of a first image pair 10 and a second image pair 20. The first image pair 10 and the second image pair 20 are captured at different times by the first camera 1L and the second camera 1R. For example, the first image pair 10 and the second image pair 20 may each include images of successive frames.

In one example, an image 10L of the first image pair 10 may be captured by the first camera 1L, and an image 10R of the first image pair 10 may be captured by the second camera 1R. The images 10L and 10R may be captured at the same time. An image 20L of the second image pair 20 may be captured by the first camera 1L after a predetermined interval from the image 10L, and an image 20R of the second image pair 20 may be captured by the second camera 1R after a predetermined interval from the image 10R. The images 20L and 20R may be captured at the same time.

Figure 3:
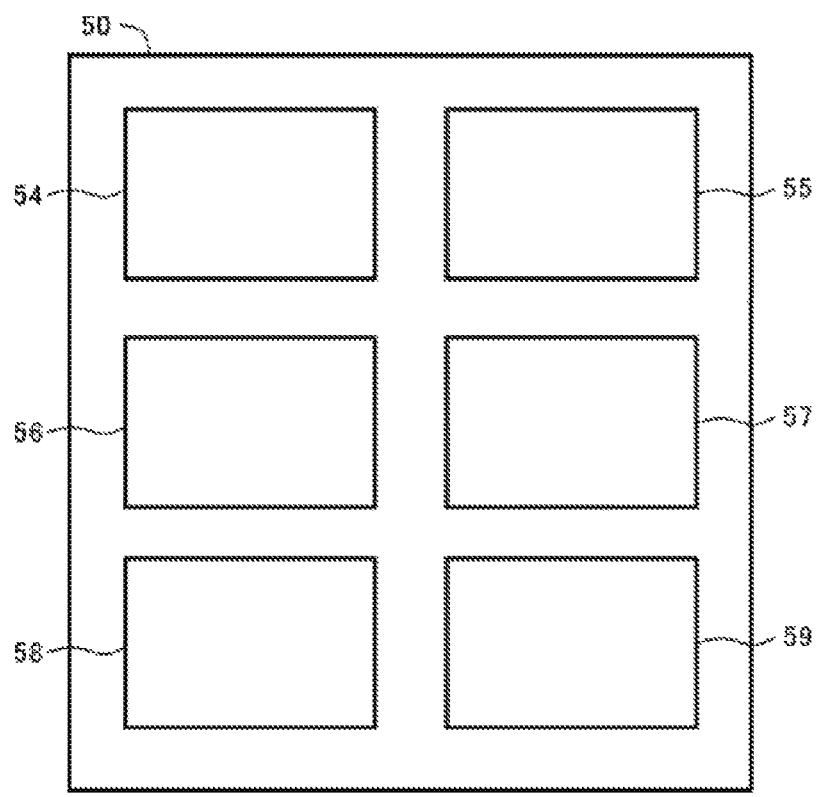
FIG. 3 is a block diagram illustrating an electronic control unit (ECU).

FIG. 3 is a block diagram illustrating the ECU 50. The processor 51 processing the above-described images 10L, 10R, 20L, and 20R may serve as a detector 54, a divider 55, a selector 56, a first calculator 57, a second calculator 58, and a third calculator 59 in accordance with the command held in the storage medium 52.

Referring back to FIG. 2, the detector 54 detects multiple corresponding points P1, P2, P3, P4, and P5 from the images 10L, 10R, 20L, and 20R. The "corresponding point" may also be referred to as a "feature point". Although the five corresponding points P1, P2, P3, P4, and P5 are illustrated in FIG. 2, a larger number of corresponding points may be detected from the images 10L, 10R, 20L, and 20R. For example, the corresponding points P1, P2, P3, P4, and P5 may each be an edge included in common in the images 10L, 10R, 20L, and 20R. For example, the corresponding points P1, P2, P3, P4, and P5 may each be detected as a point at which luminance changes.

For example, the corresponding points P1 and P2 may be included in respective outlines of blocks 31 provided along a road R. For example, the corresponding point P3 may be a point at which two parallel lines L1 and L2 on the road R meet each other on a horizontal line H. That is, the corresponding point P3 may be a point at infinity. For example, the corresponding point P4 may be included in an outline of a recess on the road R. For example, the corresponding point P5 may be included in an outline of a wall W provided along the road R. Such corresponding points may be detectable by various known stereo matching techniques.

The divider 55 divides each of the images 10L, 10R, 20L, and 20R into multiple regions A1, A2, A3, A4, and A5. In one example, the divider 55 may divide each of the images 10L, 10R, 20L, and 20R to cause each of the regions A1, A2, A3, A4, and A5 to include at least one of the corresponding points P1 to P5 that is the same for all of the images 10L, 10R, 20L, and 20R. For example, the region A1 may include the corresponding point P1 for all of the images 10L, 10R, 20L, and 20R. For example, the region A2 may include the corresponding point P2 for all of the images 10L, 10R, 20L, and 20R. For example, the region A3 may include the corresponding point P3 for all of the images 10L, 10R, 20L, and 20R. For example, the region A4 may include the corresponding point P4 for all of the images 10L, 10R, 20L, and 20R. For example, the region A5 may include the corresponding point P5 for all of the images 10L, 10R, 20L, and 20R.

In FIG. 2, the regions A1 may include the same one corresponding point P1 only, the regions A2 may include the same one corresponding point P2 only, the regions A3 may include the same one corresponding point P3 only, the regions A4 may include the same one corresponding point P4 only, and the regions A5 may include the same one corresponding point P5 only. However, the regions A1, the regions A2, the regions A3, the regions A4, and the regions A5 may include respective two or more corresponding points that are the same for the same region. Further, in FIG. 2, the images 10L, 10R, 20L, and 20R may each be divided into the five regions A1, A2, A3, A4, and A5; however, in another example embodiment, the images 10L, 10R, 20L, and 20R may each be divided into multiple regions other than five.

The selector 56 selects one reference region from among the regions A1, A2, A3, A4, and A5. The reference region may be selected on the basis of various concepts. For example, the reference region may be a region located at an end, that is, the region A1 or the region A5. Alternatively, for example, the reference region may be a region including a point at infinity. Alternatively, for example, the reference region may be a region that is estimated to be small in parallax error in advance.

General expressions relating to distance measurement by means of a stereo camera are given below.

$$s\begin{bmatrix} x \\ y \\ 1 \end{bmatrix} = \begin{bmatrix} f_x & 0 & c_x & 0 \\ 0 & f_y & c_y & 0 \\ 0 & 0 & 1 & 0 \end{bmatrix} \begin{bmatrix} r_{00} & r_{01} & r_{02} & t_x \\ r_{10} & r_{11} & r_{12} & t_y \\ r_{20} & r_{21} & r_{22} & t_z \\ 0 & 0 & 0 & 1 \end{bmatrix} \begin{bmatrix} X \\ Y \\ Z \\ 1 \end{bmatrix} \quad (1)$$

$$E = \begin{bmatrix} r_{00} & r_{01} & r_{02} & t_x \\ r_{10} & r_{11} & r_{12} & t_y \\ r_{20} & r_{21} & r_{22} & t_z \\ 0 & 0 & 0 & 1 \end{bmatrix} \quad (2)$$

Here, X, Y, and Z represent coordinate values of a three-dimensional point in a world coordinate system; x and y represent coordinate values of a projection point in a camera coordinate system; s represents a coefficient; fx and fy each represent a focal length; cx and cy each represent a principal point; rij represents a rotation component; tx, ty, and tz each represent a translation component; and E represents an external parameter.

The first calculator 57 calculates the speed (movement speed) V1 of the vehicle 500 based on the external parameter E for each of the regions A1, A2, A3, A4, and A5 by using the corresponding point P1, P2, P3, P4, or P5 included in relevant one of the regions A1, A2, A3, A4, and A5. It is possible for the first calculator 57 to calculate the external parameter E and the speed V1 by, for example, stereo simultaneous localization and mapping (SLAM) with use of the images 10L, 10R, 20L, and 20R from the stereo camera 1, and monocular SLAM with use of the images 10L and 20L from a single camera (the first camera 1L) or the images 10R and 20R from a single camera (the second camera 1R). Examples of the monocular SLAM include oriented fast and rotated brief (ORB) SLAM, parallel tracking and mapping for small AR workspaces (PTAM), and dense tracking and mapping in real-time (DTAM). The external parameter E and the speed V1 are calculable on the basis of, for example, any of various known methods usable to solve the perspec-tive-n-points (PnP) problem, including, for example, the 8-point method, the 5-point method, and the direct linear transformation (DLT) method.

Figure 4:
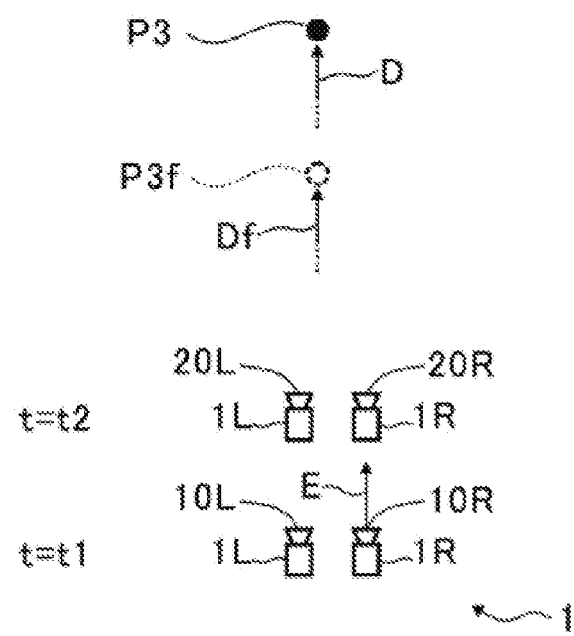
FIG. 4 schematically describes an example of calculation of a movement speed based on an external parameter.

FIG. 4 schematically describes an example of calculation of the speed V1 based on the external parameter E. In FIG. 4, for example, the speed V1 may be calculated by using the corresponding point P3 in FIG. 2. The stereo camera 1 may capture the images 10L and 10R at a time t=t1, and may thereafter capture the images 20L and 20R at a time t=t2.

For example, first, the first calculator 57 may calculate the external parameter E for the corresponding point P3 by using the images 10R and 20R captured by a single camera (the second camera 1R), that is, by monocular SLAM.

The external parameter E to be calculated from the images 10R and 20R captured by the single camera (the second camera 1R) may be assumed to be a movement vector of the second camera 1R from the time t1 to the time t2, that is, a movement vector of the vehicle 500 from the time t1 to the time t2. However, in this case, the external parameter E has a unit length (e.g., 1 km, 1 m, or 1 mm). Therefore, a pseudo corresponding point P3f calculated by using such an external parameter E is different from the actual corresponding point P3. A pseudo distance Df to the pseudo corresponding point P3f is therefore different from a distance D to the actual corresponding point P3.

However, the distance D to the actual corresponding point P3 is calculable on the basis of the principle of triangulation by using the images 10L, 10R, 20L, and 20R captured by the pair of cameras 1L and 1R. In this case, a relationship in the following expression (3) holds between the actual distance D and the pseudo distance Df.

$$D = Df \times s \quad (3)$$

A relationship in the following expression (4) holds between the translation component of the external parameter E described above and a movement distance v (km) of the camera 1R from the time t1 to the time t2, that is, the movement distance v (km) of the vehicle 500 from the time t1 to the time t2.

$$|v| = \sqrt{(t_x \times s)^2 + (t_y \times s)^2 + (t_z \times s)^2} \quad (4)$$

Therefore, the speed V1 (km/h) based on the external parameter E is calculated from the following expression (5).

$$V1 = |v| \times n \times 3600 \quad (5)$$

Here, n (FPS) represents a frame rate of the stereo camera 1.

In accordance with the method described above, the first calculator 57 calculates the speed V1 of the vehicle 500 based on the external parameter E for each of the regions A1, A2, A3, A4, and A5 by using relevant one of the corresponding points P1, P2, P3, P4, and P5.

Referring to FIG. 1, the speed V1 of the external parameter E described above can include an error dependent on an environment in which the stereo camera 1 is installed. Such an error can result from various factors including, for example, distortion of the windshield 9 and assembling error of the first camera 1L and the second camera 1R. In other words, correcting a parallax in each of the regions A1, A2, A3, A4, and A5 to cause the speed V1 based on the external parameter E to coincide with the actual speed V0 of the vehicle 500 makes it possible to eliminate such an error dependent on the environment in which the stereo camera 1 is installed.

On the basis of such an idea, the processor 51 may calculate the parallax correction values θ1, θ0, and θ. Hereinafter, the parallax correction value may be simply referred to a correction value. The correction values θ1, θ0, and θ may each be expressed in the number of pixels.

For example, the second calculator 58 may calculate an individual parallax correction value θ1 for each of the regions other than the reference region to cause the speed V1 in relevant one of the regions other than the reference region to coincide with the speed V1 in the reference region. Such a configuration reduces error variations between the regions A1, A2, A3, A4, and A5. Hereinafter, the individual parallax correction value may be simply referred to as an individual correction value.

The third calculator 59 may calculate an overall parallax correction value θ0 to cause the speed V1 in the reference region to coincide with the speed V0 measured by the vehicle speed sensor 2. Hereinafter, the overall parallax correction value may be simply referred to as an overall correction value. For the reference region, the overall correction value θ0 may serve as a correction value θ to be actually used for parallax correction (θ=θ0). For each of the regions other than the reference region, a sum of the individual correction value θ1 calculated for relevant one of the regions and the overall correction value θ0 may serve as the correction value θ to be actually used for parallax correction (θ=θ0+θ1). The processor 51 may calculate a distance to an object by using a parallax corrected by the correction value θ.

In another example embodiment, it is not necessary for the processor 51 to calculate the overall correction value θ0.

For example, the region A3 including the point at infinity P3 may be selected as the reference region, as described above. For example, Japanese Unexamined Patent Application Publication No. 2017-044573, the applicant of which is the same as the present application, discloses a method of correcting a parallax by using a point at infinity. This method makes it possible to eliminate a parallax error in the reference region A3 including the point at infinity P3. In other words, if the parallax in the reference region A3 is corrected by this method, the speed V1 based on the external parameter in the reference region A3 after the correction is supposed to be close to the actual speed V0 of the vehicle 500. The second calculator 58 may therefore calculate the individual correction value θ1 for each of the regions A1, A2, A4, and A5 other than the reference region A3 to cause the speed V1 in relevant one of the regions A1, A2, A4, and A5 to coincide with the speed V1 in the reference region A3. In this case, because the speed V1 in the reference region A3 after the correction is close to the actual speed V0 of the vehicle 500, it is not necessary to reference the speed V0 measured by the vehicle speed sensor 2. Therefore, it is not necessary for the processor 51 to calculate the overall correction value θ0. In this case, the individual correction value θ1 calculated for each of the regions serves as the correction value θ to be actually used for parallax correction (θ=θ1).

Alternatively, for example, a region that is estimated to be small in parallax error in advance may be selected as the reference region, as described above. In other words, the speed V1 based on the external parameter in such a reference region is supposed to be close to the actual speed V0 of the vehicle 500 without any correction to the parallax. In this case, the second calculator 58 may calculate the individual correction value θ1 for each of the regions other than the reference region to cause the speed V1 in relevant one of the regions to coincide with the speed V1 in the reference region. In this case also, it is not necessary to reference the speed V0 measured by the vehicle speed sensor 2. Therefore, it is not necessary for the processor 51 to calculate the overall correction value θ0. In this case, the individual correction value θ1 calculated for each of the regions serves as the correction value θ to be actually used for parallax correction (θ=θ1).

In still another example embodiment, it is not necessary for the processor 51 to select the reference region.

In one example, the second calculator 58 may calculate the individual correction value θ1 for each of the regions A1, A2, A3, A4, and A5 to cause the speed V1 in relevant one of the regions A1, A2, A3, A4, and A5 to coincide with the speed V0 measured by the vehicle speed sensor 2. In this case, it is not necessary for the processor 51 to select the reference region. Further, it is not necessary for the processor 51 to calculate the overall correction value θ0. In this case, the individual correction value θ1 calculated for each of the regions serves as the correction value θ to be actually used for parallax correction (θ=θ1).

Next, the operations of the ECU 50 will be described with reference to a flowchart.

Figure 5:
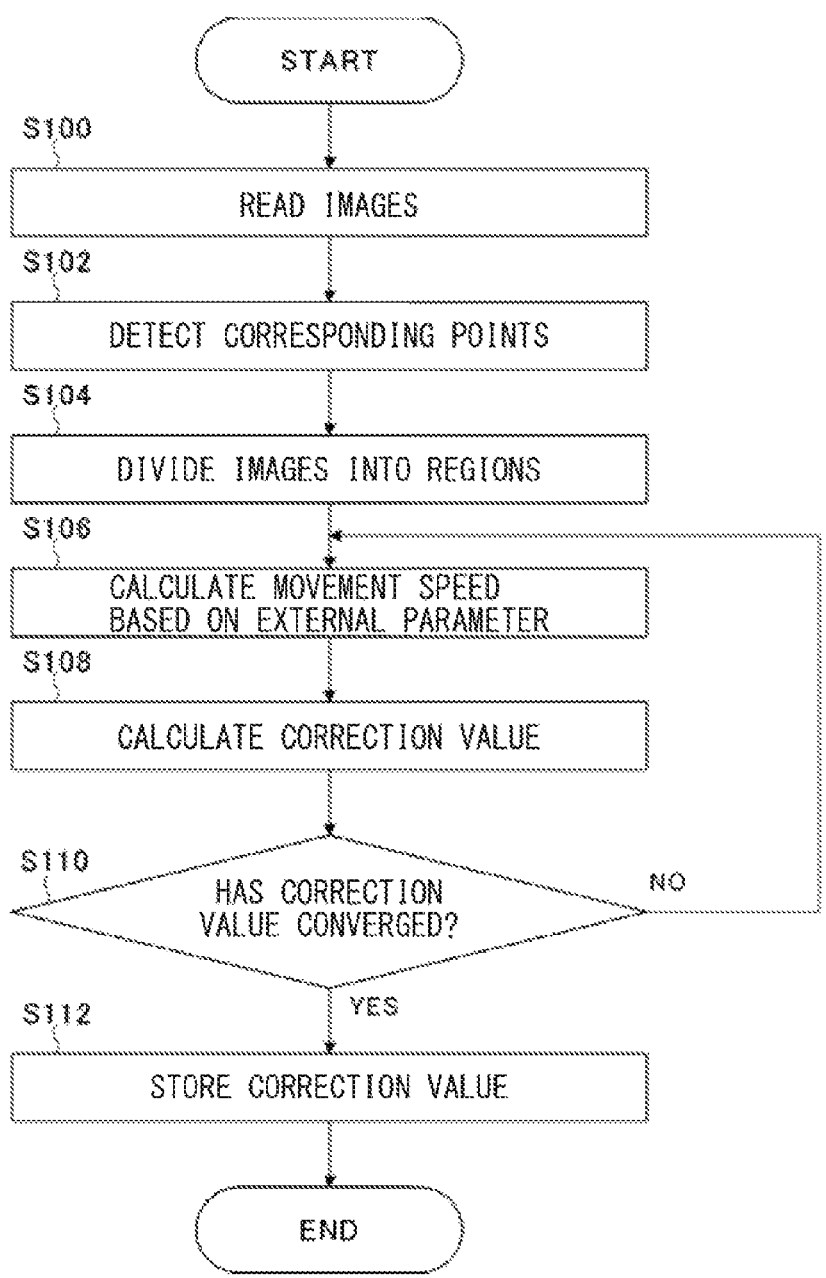
FIG. 5 is a flowchart illustrating an example of operations of the ECU.

FIG. 5 is a flowchart illustrating an example of the operations of the ECU 50. In the example in FIG. 5, the processor 51 may serve as neither of the selector 56 and the third calculator 59. Thus, no reference region may be selected, and no overall correction value θ0 may be calculated.

For example, the series of operations illustrated in FIG. 5 may be performed only once after the ECU 50 is activated by pressing of a start button of the vehicle 500, or may be repeated at predetermined intervals after the ECU 50 is activated.

The processor 51 may read the images 10L, 10R, 20L, and 20R captured by the first camera 1L and the second camera 1R (step S100).

Thereafter, the processor 51 detects the corresponding points P1, P2, P3, P4, and P5 from the images 10L, 10R, 20L, and 20R (step S102).

Thereafter, the processor 51 divides each of the images 10L, 10R, 20L, and 20R into the multiple regions A1, A2, A3, A4, and A5 (step S104).

Thereafter, the processor 51 calculates the speed V1 based on the external parameter E for each of the regions A1, A2, A3, A4, and A5 by using relevant one of the corresponding points P1, P2, P3, P4, and P5 (step S106).

Thereafter, the processor 51 calculates the parallax correction value θ for each of the regions A1, A2, A3, A4, and A5 to cause a difference between the speed V1 in relevant one of the regions A1, A2, A3, A4, and A5 and the speed V0 measured by the vehicle speed sensor 2 to fall below a predetermined threshold (step S108). For example, the processor 51 may calculate the parallax correction value θ for each of the regions A1, A2, A3, A4, and A5 to cause the speed V1 in relevant one of the regions A1, A2, A3, A4, and A5 to coincide with the speed V0 measured by the vehicle speed sensor 2.

Thereafter, the processor 51 may determine whether the correction value θ for each of the regions A1, A2, A3, A4, and A5 has converged (step S110). For example, the processor 51 may perform step S110 by determining whether a difference between the speed V1 after correction by the correction value θ and the speed V0 measured by the vehicle speed sensor 2 falls below a predetermined threshold.

If the processor 51 determines in step S110 that the correction value θ for each of the regions A1, A2, A3, A4, and A5 has not converged (NO), the processor 51 may repeat steps S106 to S110.

If the processor 51 determines in step S110 that the correction value θ for each of the regions A1, A2, A3, A4, and A5 has converged (YES), the processor 51 may store the calculated correction value θ for each of the regions A1, A2, A3, A4, and A5 in the storage medium 52 (step S112), and may cause the series of operations to end. Thereafter, the processor 51 may calculate a distance to an object by using the parallax corrected by the correction value θ.

Figure 6:
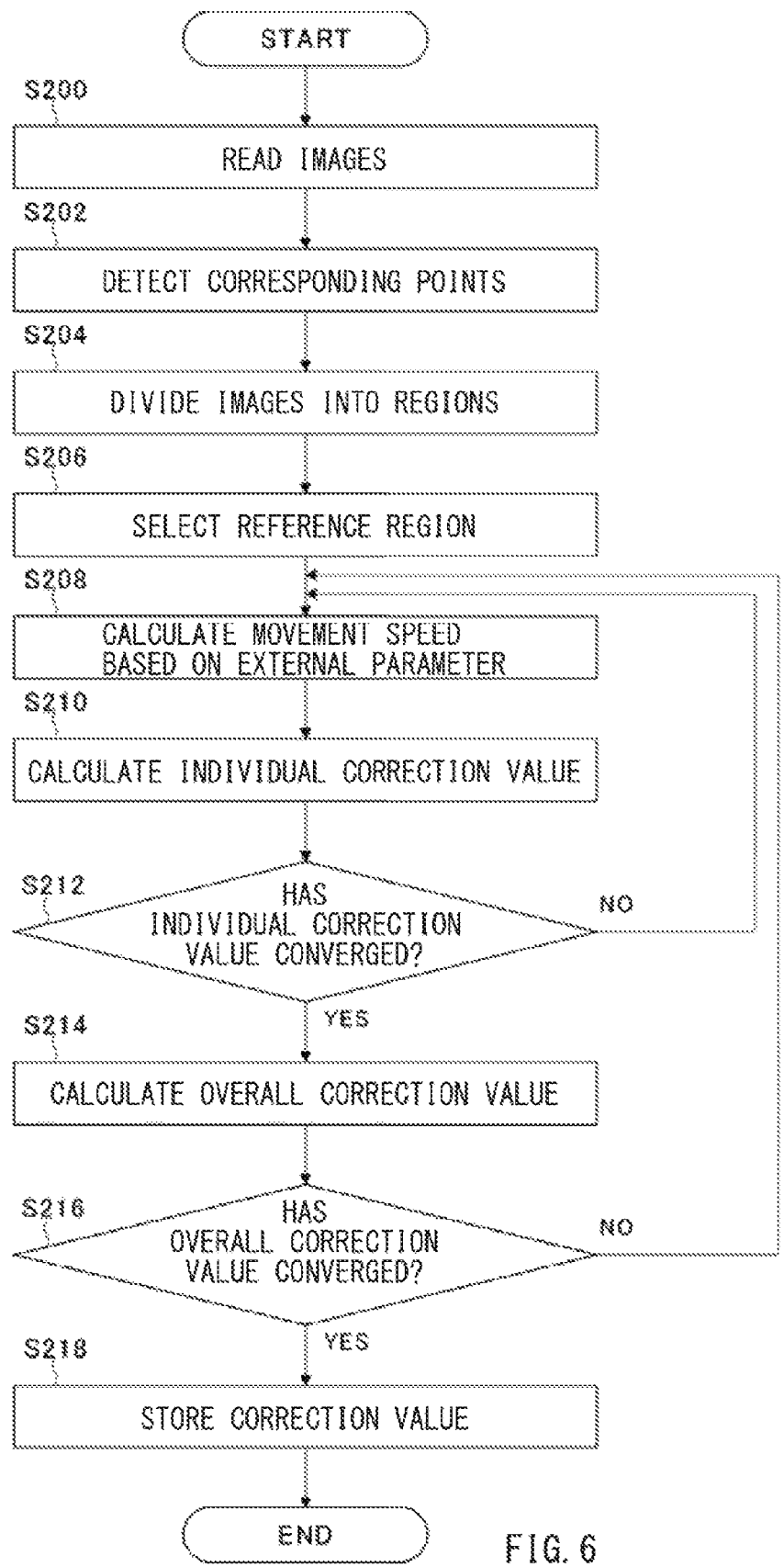
FIG. 6 is a flowchart illustrating another example of operations of the ECU.

FIG. 6 is a flowchart illustrating another example of the operations of the ECU 50. In the example in FIG. 6, the processor 51 may serve as the selector 56 and the third calculator 59. Thus, selection of the reference region may be performed, and the overall correction value θ0 may be calculated.

For example, the series of operations illustrated in FIG. 6 may be performed only once after the ECU 50 is activated by pressing of the start button of the vehicle 500, or may be repeated at predetermined intervals after the ECU 50 is activated.

The processor 51 may read the images 10L, 10R, 20L, and 20R captured by the first camera 1L and the second camera 1R (step S200).

Thereafter, the processor 51 detects the corresponding points P1, P2, P3, P4, and P5 from the images 10L, 10R, 20L, and 20R (step S202).

Thereafter, the processor 51 divides each of the images 10L, 10R, 20L, and 20R into the multiple regions A1, A2, A3, A4, and A5 (step S204).

Thereafter, the processor 51 selects the reference region from among the multiple regions A1, A2, A3, A4, and A5 (step S206). In this example, the processor 51 may select the region A1 located at an end as the reference region, for example.

Thereafter, the processor 51 calculates the speed V1 based on the external parameter E for each of the regions A1, A2, A3, A4, and A5 by using relevant one of the corresponding points P1, P2, P3, P4, and P5 (step S208).

Thereafter, the processor 51 calculates the individual correction value θ1 for each of the regions A2, A3, A4, and A5 other than the reference region A1 to cause a difference between the speed V1 in the reference region A1 and the speed V1 in relevant one of the regions A2, A3, A4, and A5 to fall below a predetermined threshold (step S210). For example, the processor 51 may calculate the individual correction value θ1 for each of the regions A2, A3, A4, and A5 to cause the speed V1 in the reference region A1 and the speed V1 in relevant one of the regions A2, A3, A4, and A5 to coincide with each other.

Thereafter, the processor 51 may determine whether the individual correction value θ1 for each of the regions A2, A3, A4, and A5 has converged (step S212). For example, the processor 51 may perform step S212 by determining whether a difference between the speed V1 in each of the regions A2, A3, A4, and A5 after correction by the correction value θ1 and the speed V0 in the reference region A1 falls below a predetermined threshold.

If the processor 51 determines in step S212 that the individual correction value θ1 for each of the regions A2, A3, A4, and A5 has not converged (NO), the processor 51 may repeat steps S208 to S212.

If the processor 51 determines in step S212 that the individual correction value θ1 for each of the regions A2, A3, A4, and A5 has converged (YES), the processor 51 may calculate the overall correction value θ0 to cause a difference between the speed V1 in the reference region A1 and the speed V0 measured by the vehicle speed sensor 2 to fall below a predetermined threshold (step S214). For example, the processor 51 may calculate the overall correction value θ0 to cause the speed V1 in the reference region A1 to coincide with the speed V0 measured by the vehicle speed sensor 2.

Thereafter, the processor 51 may determine whether the overall correction value θ0 has converged (step S216). For example, the processor 51 may perform step S216 by determining whether a difference between the speed V1 in the reference region A1 after correction by the correction value θ0 and the speed V0 measured by the vehicle speed sensor 2 falls below a predetermined threshold.

If the processor 51 determines in step S216 that the overall correction value θ0 has not converged (NO), the processor 51 may repeat steps S208 to S216.

If the processor 51 determines in step S216 that the overall correction value θ0 has converged (YES), the processor 51 may store the correction values θ, that is, θ equal to θ0 for the reference region A1 and θ equal to θ0+θ1 for the regions A2, A3, A4, and A5 other than the reference region A1, in the storage medium 52 (step S218) and may cause the series of operations to end. Thereafter, the processor 51 may calculate a distance to an object by using the parallax corrected by the correction values θ.

The stereo camera apparatus 100 as described above includes the stereo camera 1, the vehicle speed sensor 2, and the ECU 50. The ECU 50 includes the one or more processors 51, and the one or more storage media 52 that hold a command to be executed by the one or more processors 51. In the example in FIG. 5, the processor 51 is configured to, in accordance with the command: detect the multiple corresponding points P1, P2, P3, P4, and P5 from the first image pair 10 and the second image pair 20 to be captured at different times t1 and t2 by the stereo camera 1; divide each of the images 10L, 10R, 20L, and 20R of the first image pair 10 and the second image pair 20 into the multiple regions A1, A2, A3, A4, and A5; calculate, for each of the multiple regions A1, A2, A3, A4, and A5, the speed V1 based on the external parameter E by using the corresponding point P1, P2, P3, P4, or P5 included in relevant one of the multiple regions; and calculate, for each of the multiple regions A1, A2, A3, A4, and A5, the parallax correction value θ to cause a difference between the speed V1 based on the external parameter E and the speed V0 detectable by the vehicle speed sensor 2 to fall below a threshold. Such a configuration makes it possible to calculate the correction value θ for each of the regions A1, A2, A3, A4, and A5 in the images in accordance with the status of relevant one of the regions A1, A2, A3, A4, and A5 in an environment in which the stereo camera 1 is actually installed. Accordingly, a parallax error that is difficult to estimate in advance is eliminable in accordance with the environment in which the stereo camera 1 is actually installed.

Further, in the example in FIG. 6, the processor 51 is configured to select the reference region A1 from among the multiple regions A1, A2, A3, A4, and A5, and to calculate the individual parallax correction value θ1 for each of the regions A2, A3, A4, and A5 other than the reference region A1 to cause a difference between the speed V1 in the reference region A1 and the speed V1 in relevant one of the regions A2, A3, A4, and A5 to fall below a predetermined threshold. Such a configuration reduces error variations between the regions A1, A2, A3, A4, and A5. Further, with such a configuration also, a parallax error that is difficult to estimate in advance is eliminable in accordance with the environment in which the stereo camera 1 is actually installed.

Moreover, in the example in FIG. 6, the processor 51 may be further configured to calculate the overall parallax correction value θ0 common to the multiple regions A1, A2, A3, A4, and A5 to cause a difference between the speed V1 based on the external parameter E in the reference region A1 and the speed V0 measurable by the vehicle speed sensor 2 to fall below a predetermined threshold. Such a configuration makes it possible for the processor 51 to use the sum of the individual parallax correction value θ1 and the overall parallax correction value θ0 as the correction value θ for actual parallax correction.

Although some example embodiments of the technology have been described above with reference to the accompanying drawings, embodiments of the technology are not limited thereto. It should be appreciated that modifications and alterations may be made by persons skilled in the art without departing from the scope as defined by the appended claims. The technology is intended to include such modifications and alterations in so far as they fall within the scope of the appended claims or the equivalents thereof. Further, the steps to be performed by the ECU 50 described in relation to the foregoing embodiments need not be performed in the described order, and may be performed in a different order unless a technical contradiction occurs.

The processor 51 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 51. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 51 illustrated in FIG. 1.

The invention claimed is:

1. A stereo camera apparatus comprising:
a stereo camera;
a speed sensor; and
a control device,
the control device including
one or more processors, and
one or more storage media that hold a command to be executed by the one or more processors,
the one or more processors being configured to, in accordance with the command:
detect corresponding points from a first image pair and a second image pair to be captured at different times by the stereo camera;
divide each of images of the first image pair and the second image pair into regions;
calculate, for each of the regions, a movement speed based on an external parameter by using one or more of the corresponding points included in the each of the regions; and
calculate, for the each of the regions, a parallax correction value to cause a difference between the movement speed based on the external parameter and a movement speed detectable by the speed sensor to fall below a predetermined threshold.

2. A stereo camera apparatus comprising:
a stereo camera; and
a control device,
the control device including
one or more processors, and
one or more storage media that hold a command to be executed by the one or more processors,
the one or more processors being configured to, in accordance with the command:
detect corresponding points from a first image pair and a second image pair to be captured at different times by the stereo camera;
divide each of images of the first image pair and the second image pair into regions;
select a reference region from among the regions;
calculate, for each of the regions, a movement speed based on an external parameter by using one or more of the corresponding points included in the each of the regions; and
calculate an individual parallax correction value for the each of the regions other than the reference region to cause a difference between the movement speed in the reference region and the movement speed in the each of the regions other than the reference region to fall below a predetermined threshold.

3. The stereo camera apparatus according to claim 2, further comprising a speed sensor, wherein the one or more processors are further configured to, in accordance with the command, calculate an overall parallax correction value common to the regions to cause a difference between the movement speed in the reference region and a movement speed measurable by the speed sensor to fall below a predetermined threshold.

4. A control device communicable with a stereo camera and a speed sensor to be provided in a mobile body, the control device comprising:
one or more processors; and
one or more storage media that hold a command to be executed by the one or more processors,
the one or more processors being configured to, in accordance with the command:
detect corresponding points from a first image pair and a second image pair to be captured at different times by the stereo camera;
divide each of images of the first image pair and the second image pair into regions;
calculate, for each of the regions, a movement speed based on an external parameter by using one or more of the corresponding points included in the each of the regions; and
calculate, for the each of the regions, a parallax correction value to cause a difference between the movement speed based on the external parameter and a movement speed detectable by the speed sensor to fall below a predetermined threshold.

* * * * *